Figure 1:
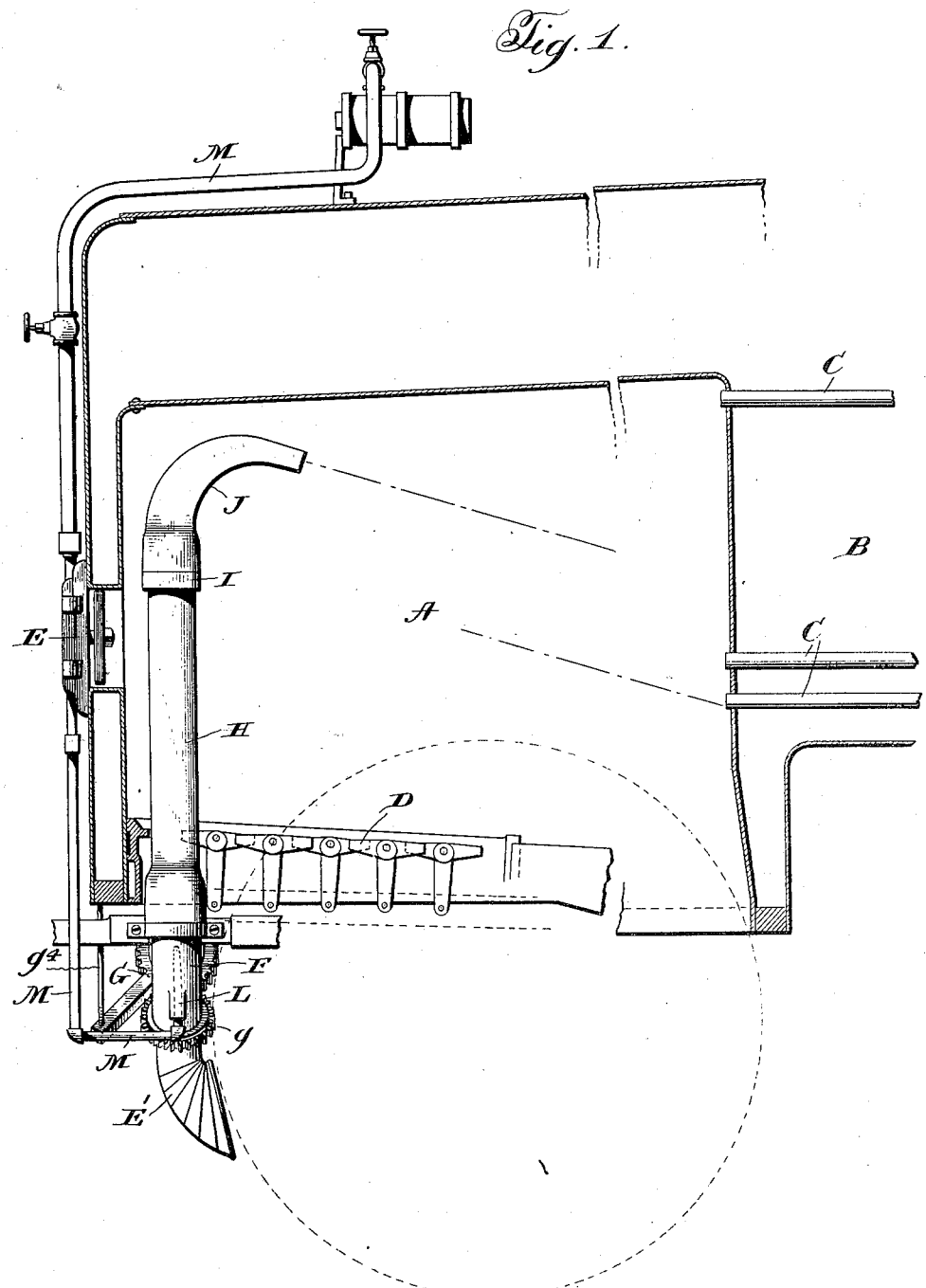

J. H. PARSONS.
MEANS FOR SECURING COMBUSTION OF COAL AND SIMILAR PRODUCTS.
APPLICATION FILED APR. 15, 1908.

1,066,044.

Patented July 1, 1913.

7 SHEETS—SHEET 1.

Witnesses:
Jas. E. Hutchinson
Calvin T. Milans

Inventor:
John H. Parsons,
By _____ Attorneys.

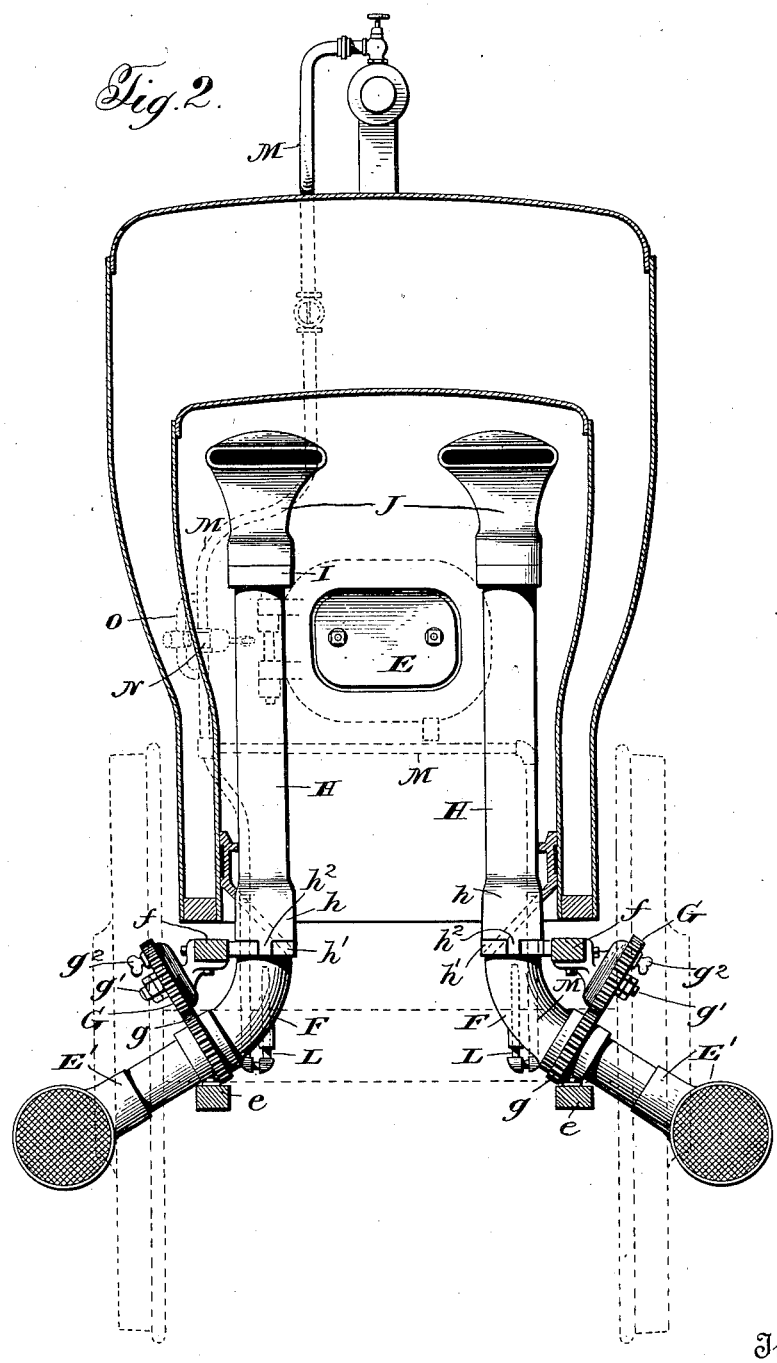

J. H. PARSONS.
MEANS FOR SECURING COMBUSTION OF COAL AND SIMILAR PRODUCTS.
APPLICATION FILED APR. 15, 1908.
1,066,044.
Patented July 1, 1913.
7 SHEETS—SHEET 3.
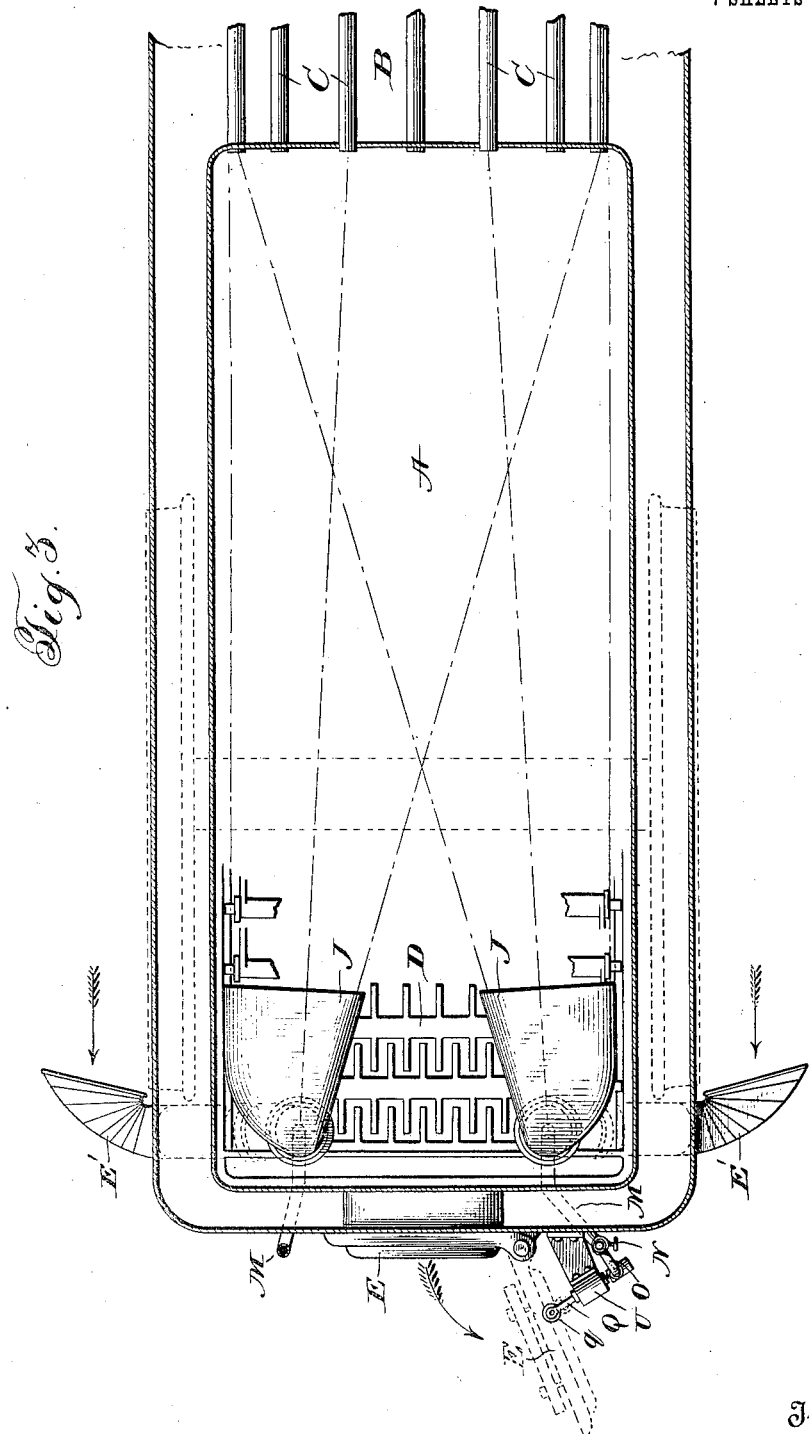

J. H. PARSONS.
MEANS FOR SECURING COMBUSTION OF COAL AND SIMILAR PRODUCTS.
APPLICATION FILED APR. 15, 1908.
1,066,044.
Patented July 1, 1913.
7 SHEETS—SHEET 4.
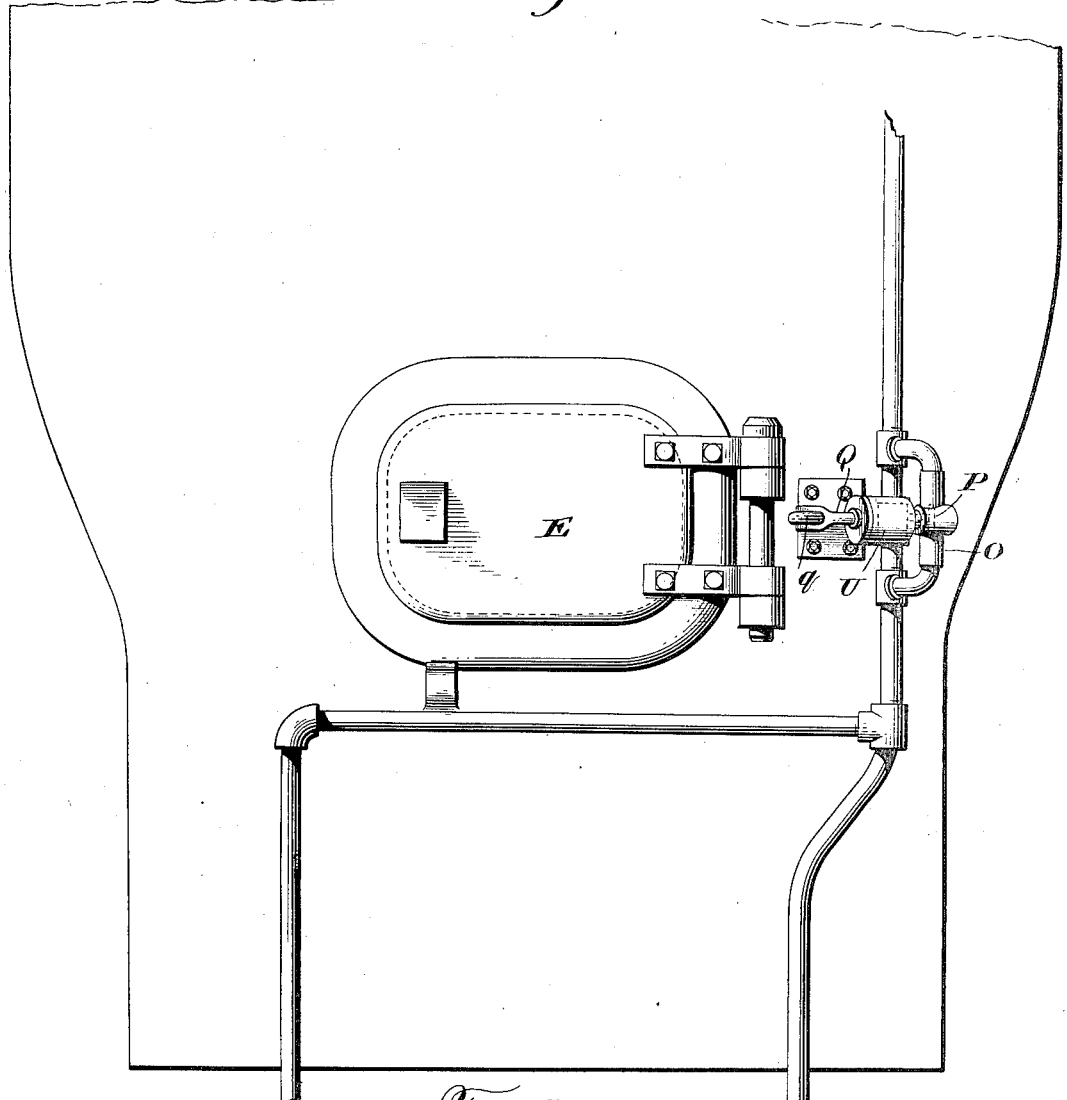
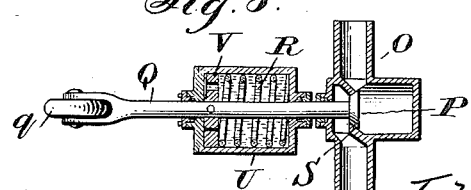

J. H. PARSONS.
MEANS FOR SECURING COMBUSTION OF COAL AND SIMILAR PRODUCTS.
APPLICATION FILED APR. 15, 1908.
1,066,044.
Patented July 1, 1913.
7 SHEETS—SHEET 5.
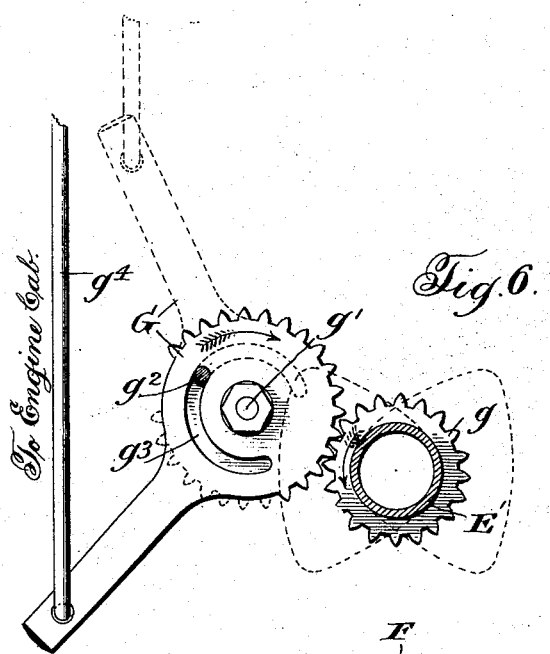
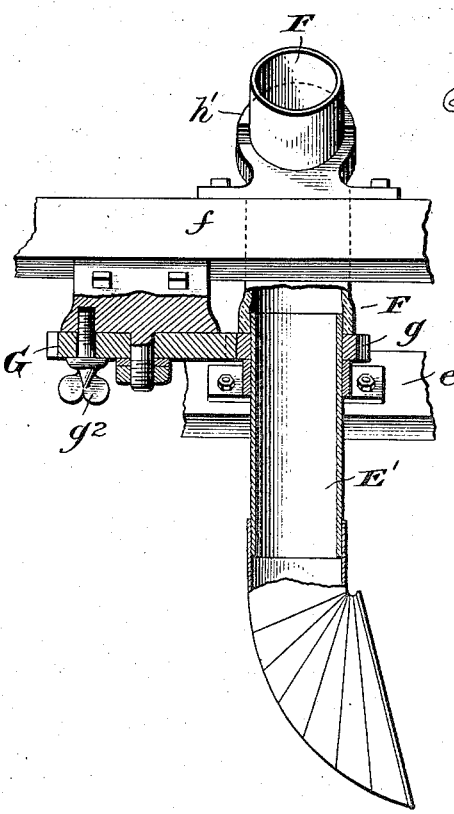

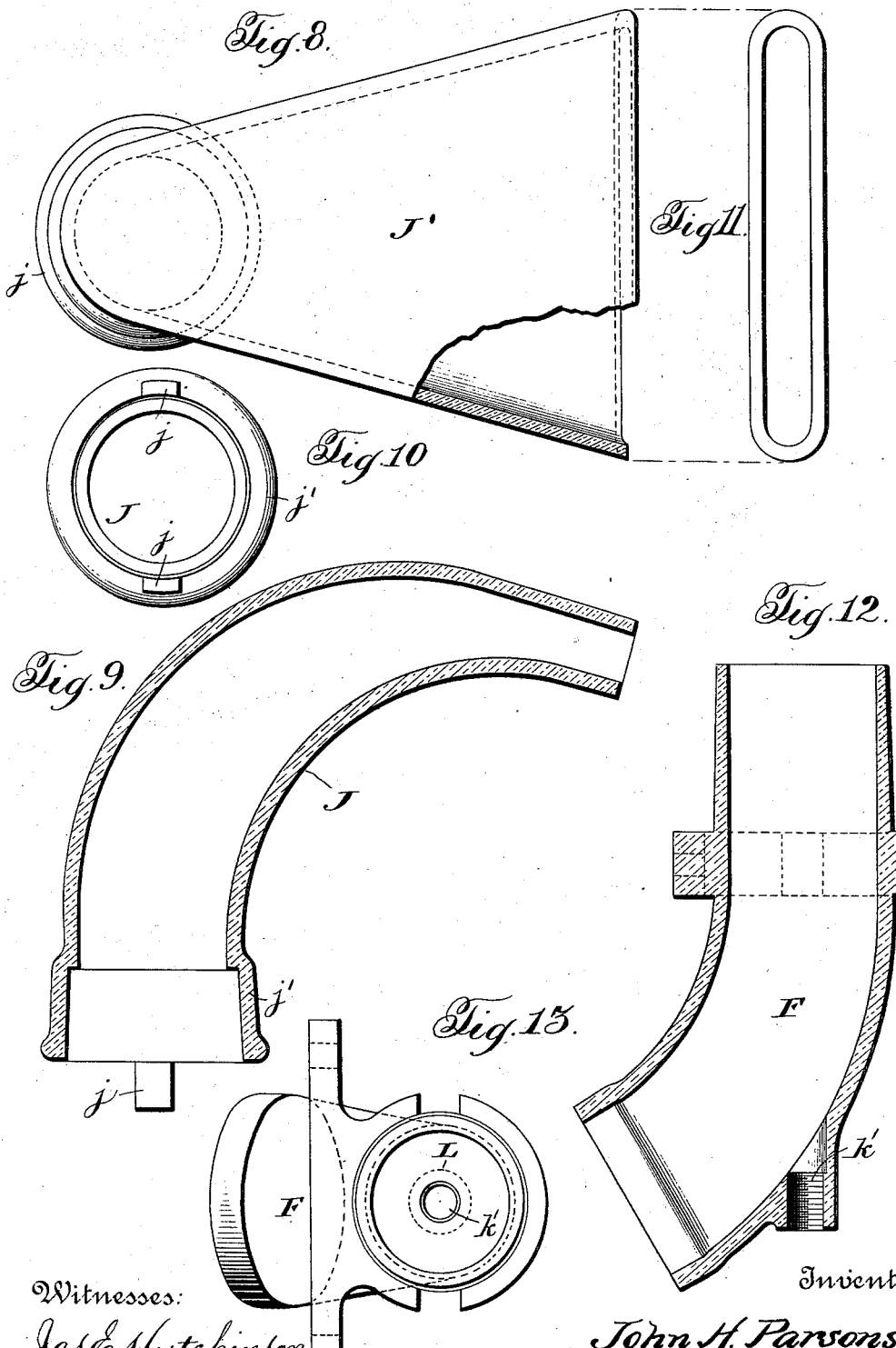

J. H. PARSONS.
MEANS FOR SECURING COMBUSTION OF COAL AND SIMILAR PRODUCTS.
APPLICATION FILED APR. 15, 1908.

1,066,044.

Patented July 1, 1913.

7 SHEETS—SHEET 7.

Witnesses:
Jas. E. Hutchinson
Calvin T. Milans

Inventor:
John H. Parsons,
By Mann & Mann
Attys.

UNITED STATES PATENT OFFICE.

JOHN H. PARSONS, OF WILMINGTON, DELAWARE, ASSIGNOR TO PARSONS ENGINEERING COMPANY, OF WILMINGTON, DELAWARE, A CORPORATION OF DELAWARE.

MEANS FOR SECURING COMBUSTION OF COAL AND SIMILAR PRODUCTS.

1,066,044. Specification of Letters Patent. Patented July 1, 1913.

Application filed April 15, 1908. Serial No. 427,119.

*To all whom it may concern:*

Be it known that I, JOHN H. PARSONS, a citizen of the United States, residing at Wilmington, in the county of Newcastle and State of Delaware, have invented certain new and useful Improvements in Means for Securing Combustion of Coal and Similar Products, of which the following is a specification, reference being had therein to the accompanying drawing.

This invention relates to the art of fuel combustion, and has for its object the provision of an improved apparatus for carrying into practical effect my method of insuring substantially complete combustion of coal and similar products, as fully disclosed and claimed in my co-pending application Serial No. 400,169, filed Oct. 31, 1907.

With reference to the characteristic features of the present apparatus, it may be noted that they are ancillary to the apparatus disclosed and claimed in my co-pending application Serial No. 344,794, filed Nov. 23, 1906.

The present invention comprehends the employment of means, preferably separated nozzles, for the introduction of air in sheet formation over the bed of fuel in the fire chamber of a furnace, the sheet being preferably under force and traveling in the general direction of the normal draft through the fire chamber, and the air thereof having been previously prepared to the proper temperature (approximately the kindling point when commingled with the gases within the fire chamber) by conducting the same through the burning or incandescent bed of fuel. The parts are so proportioned that the air discharged above the fuel is abundant to effect complete combustion of all gases or smaller particles of fuel arising from the bed, and theoretically may be stated as being equal to the difference between the suction capacity of the exhaust of the apparatus and the air which is permitted to pass through the grate when clogged by the fuel bed. It will be appreciated that if a volume of air could pass through the grate and fuel whereby sufficient oxygen would be furnished above the fuel, practically complete combustion would result, but the clogging of the grate by the bed of fuel impedes and prevents the introduction of sufficient air, and the oxygen of the air which does enter is consumed during its passage through the incandescent fuel whereby practically no oxygen reaches the area above the fuel to enable consumption of the combustible gases and other products arising from the fuel. Therefore it may be said that the present invention has in mind the supplying of the deficiency of air caused by the inability of have the full and free circulation through the grate and fuel. By preparing the air by the burning bed of fuel it is ready for instantaneous ignition upon its discharge into the fire chamber and commingling with the gases therein, and the temperature within the fire chamber is uniformly preserved. Where the sheet is composed of several merging fan-like sheets, the apparatus is preferably formed whereby the outer edges of the united sheet will travel in lines parallel to the side walls of the fire box, while the merged portion of the sheet will be diffused partially or wholly into a spray within the combustion area. The sheet of air being under force, as stated, the same will constitute a moving barrier over the entire bed of fuel, traveling on a line intersecting the lowermost series of boiler tubes or bottom of the exhaust flue, thus compelling the arising gases or products to commingle with the air and be consumed therewith.

Among the novel features of an apparatus constituting a convenient embodiment of the present invention may be mentioned means enabling an adjustment of the discharge nozzles; means permitting the adjustment of the air intake funnels; the special shape of the mouths of the air discharge nozzles, and the arrangement thereof; and instrumentalities whereby, when the fire box door is opened for the introduction of a fresh supply of fuel, a relatively increased volume of air will be forced into the combustion area and above the fuel to compensate for and insure combustion of the dense black products initially arising from the fresh fuel, the necessary oxygen for which is prevented from passing through the grate in the regular way owing to the clogging of the grate passages by said fresh fuel.

With a view to facilitating a better understanding of my present invention, I have shown in the accompanying drawings forming a part hereof, a locomotive possessing the novel details hereinabove recited, and others, but it will be readily understood by those skilled in the art that in practising the invention I am not limited to the particular structure of the embodiment disclosed, but may with equal facility and in keeping with the spirit of the invention, resort to other embodiments adapted to the peculiar and different uses to which the invention may be put.

Figure 15:
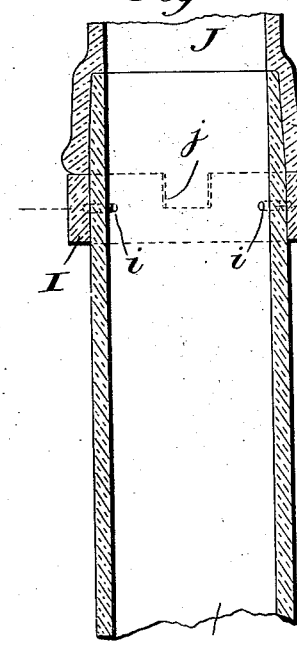
Figure 16:
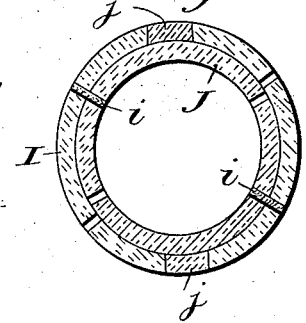
Figure 17:
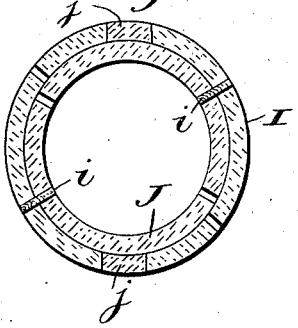
Figure 14:
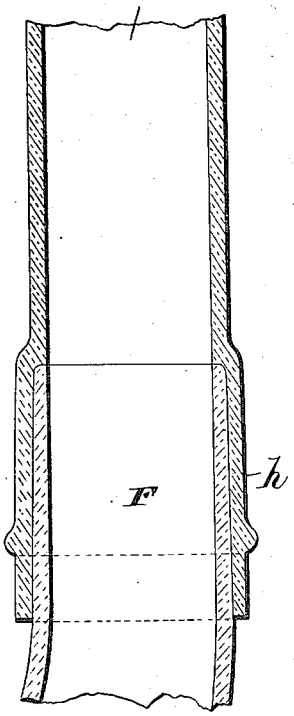

In the drawings: Figure 1 is a vertical sectional view of a portion of a locomotive through the fire-box thereof, the central portion of the fire box being broken away and removed, enabling the remaining (end) portions to be placed contiguous to each other, as shown. Fig. 2 is a vertical transverse sectional view of the same, Fig. 3 is a horizontal sectional view showing the air intake funnels and the discharge nozzles in elevation, Fig. 4 is an enlarged end view showing the door of the fire-box and the means coöperating therewith, Fig. 5 is a detail sectional view of the timed or slow-closing valve which operates in conjunction with the door. Figs. 6 and 7 are detail views, partly in section, showing one of the air intake funnels and the adjusting instrumentalities therefor, Fig. 8 is an enlarged elevation of an air injecting nozzle constituting a modified embodiment of the invention, a part being broken away, Figs. 9, 10 and 11 are vertical sectional and end views respectively, of the same, Figs. 12 and 13 are vertical sectional and top views respectively of the bottom or supporting section of the air supply pipe constituting the coupling between each nozzle and its air intake funnel, Fig. 14 is an enlarged elevation of one of the air intake funnels, and Figs. 15, 16 and 17 are longitudinal and transverse sections respectively, of a section of the air-pipe or nozzle showing the manner of detachably and adjustably uniting adjoining pieces together.

Referring more specifically to the drawings, wherein like reference characters designate corresponding parts in the several views, A represents the fire-box of the locomotive, B the steam boiler thereof, C the tubes or flues of the latter, D the fire-box grate, and E the door of the fire-box, it being understood that the locomotive has the usual exhaust apparatus operating through the engine stack, not necessary to be shown herein.

Projecting laterally beyond the sides of the fire-box A and occupying positions somewhat lower than the plane of the grate D are a pair of intake funnels E, the openings thereof being normally disposed forwardly of the engine whereby to receive the air forced thereinto incident to the travel of the engine. The funnels are supported upon the engine frame by brackets $e$ and loosely fit at one end into transverse connecting pipes F, which latter are in turn supported from brackets $f$, the purpose of this fit being to permit the turning of the funnels around into any position of adjustment desired, even to the extent of reversing the same to a position facing rearwardly of the engine. The medium by which this adjustment is secured consists of a pinion $g$ rigidly secured to the hollow shank of the funnel meshing with a corresponding, though enlarged toothed lever G, pivoted as at $g'$ to the frame of the engine and adapted to be locked in its various positions of adjustment by a thumb screw $g^2$ passing through an elongated curved slot $g^3$. The lever is actuated in any manner desired, probably most conveniently by a link or rod connection $g^4$ running to the engine cab or to some operating device adjacent thereto.

The pipes F lead inwardly to points near the forward corners of the fire-box (and by forward corners I mean the door end of the same) whence they are connected to upright pipes H, of fire-brick, or similar substance, or metal having a protected face, as illustrated for instance in my copending application, Serial No. 420,537. These upright pipes are provided with collars or annular flanges $h$ wherein to receive the upper ends of the connecting pipe F, the latter having a recessed ring $h'$ for the reception of lugs $h^2$ on the pipes H whereby they interlock and are prevented from relative turning. Near the upper end of each section H is formed a similarly recessed ring I, adjustable circumferentially by means of pins $i$ fitting alined apertures in the pipe and ring, for receiving the lugs $j$ carried by the enlargements $j'$ on the air injecting nozzles J. The purpose of the adjusting means is to enable the proper adjustment of the nozzles, as may be determined prior to the use of the apparatus to suit the conditions of the particular furnace in which they are used.

By forming the nozzles in sections, they are not only readily assembled and detached, but the different portions of the same when fractured or otherwise impaired may be detached and discarded and a new section supplied while preserving the other sections for continued service.

Each air injecting nozzle has a mouth piece J which is of a curved elbow type of decreasing interior area toward its outlet, merging from a circular cross section at its connection with the pipe I into an obliquely arranged elongated flat discharge end whereby to emit a fan-like sheet of air as indicated by dotted lines in Fig. 3, which when united with the sheet from the other nozzle, together form a single sheet passing over substantially the entire bed of fuel. By this peculiar formation of the nozzle, it will be clear that as the air passes upwardly there-through it not only becomes heated to an increasing temperature, but its expansion is also increased whereby as an incident to the relatively restricted capacity of the exit portion of the nozzle, the escape of the air will be with great force or impetus. The discharge ends or mouth pieces of the nozzles extend to a point somewhat above the door of the fire-box and are forwardly and downwardly inclined substantially on the line indicated in Fig. 1, which as shown, intersects the lowermost series of boiler tubes C. The sheets of air will thus be forced in the general direction or line of draft through the fire chamber whereby not to create currents which would conflict with said draft, and the moving sheet will substantially overlie and intercept all of the arising gases and small particles from the fuel bed, while at the same time disseminating partially into spray, thus insuring intimate commingling of the air with said gases and the resultant combustion of the mixture.

The mouth pieces J of the nozzle shown in Fig. 3 are formed whereby their outer edges will extend parallel to the side wall of the fire box while in Fig. 8, as at J', the mouth piece is shown with the edges thereof diverting outwardly from the inlet end of the same.

The air intake funnels are formed hood-shaped as shown in Fig. 14, whereby the inlet thereinto is presented forwardly longitudinally of the engine, while the back or deflecting wall of the same is gradually curved inwardly whereby to be devoid of any severe angles or corners which might form air pockets or the like.

It may be necessary at times, as for instances, where the locomotive is at a standstill, or in the case of stationary engines, to utilize a means in addition to the usual draft through the stack or chimney to secure the desired inflow of air, and as a means to that end I provide blowers or fans, as illustrated for instance in my copending application Serial No. 344,794, in lieu of the funnels, or each of the sections F may have vertically disposed apertures k' into which are inserted jet nozzles L leading from a steam pipe M running to the steam dome, or a source of steam supply from the engine, or to a compressed air tank or pump. The pipe M has a manually controllable valve N and an automatically actuable valve now to be considered.

In the supply pipe M there is a by-pass O in which a valve P, having an operating stem Q and a closing spring R, normally closes the opening S, this being the position the valve occupies when the furnace door is shut. At the outer or free end of the valve stem Q is an anti-friction device q, so arranged that it will come into engagement with the furnace door when the latter is opened, whereby to unseat the valve P against the pressure of the spring R and permit steam, compressed air, etc., to pass through the pipes and jet nozzles into the air supply nozzles, as is obvious. A retarding device, such as a cylinder U, filled with oil, or equivalent fluid, and an apertured piston V on the valve stem Q is provided to retard the closing of the valve for a predetermined period of time after the door has been removed from contact with the wheel on the valve stem when the door is closed. By this arrangement the door may be immediately closed but the action of the retarding device will permit the valve to be restored to normal or closed position only after a slow gradual movement, whereby the injection of steam and air, or either, will be continued for the required period of time after the door is closed to insure the complete combustion of the heavier or dense gases or combustible products arising from the bed of fuel following the introduction of the fresh supply. The closed or normal position of the valve, its stem, etc., is illustrated in Fig. 5 while the relative positions of the opened door and valve stem coöperating therewith is shown by dotted lines in Fig. 3.

Probably the best results are obtained if the proportions of air introduced through the nozzles and the normal draft through the fire grate and fuel, is such that they together approximate the total or maximum suction capacity of the exhaust or stack. Say, for example, the maximum pressure created by the exhaust or stack is 100%, and the amount of air permitted to pass up through the grate when impeded by the body of fuel thereon is sufficient to supply 70% of the demand of the exhaust or stack, then the other 30% required to prevent the vacuum is supplied by the nozzles. Of course these proportions are illustrative only and will differ to suit the conditions of the particular engine or furnace being worked, it being sufficient to recognize the fact that the joint capacity of air introduced through the fuel and that of the air supply nozzles is equal to the demand of the suction of the exhaust or stack whereby it is not only impossible for finer particles of fuel to be drawn off by over-suction and discharged through the stack, but the air introduced above the fuel commingling with the arising gases creates a mixture which ignites instantly and is thoroughly consumed, and so without in the least interfering with the draft through the fuel. Of course it is to be understood that the pressure can be produced by force as well as by suction. It is also to be understood that when the air passing through the nozzles is introduced into the furnace it is with considerable force whereby its speedy deliverance will supply the proper amount of air, and by its force or impetus will be directed to the proper point or locality to interrupt the combustible gases immediately above the burning fuel and cause their complete consumption.

Where I have hereinabove referred, generally, to the air heating and injecting "nozzle", and where I refer simply to the nozzle in the hereto appended claims, it is with the understanding that that portion of the apparatus constituted by the pipe H and mouth piece J is contemplated, or, in other words, that portion of the attachment which is seated within the fire box.

In some of the appended claims I refer to a steam jet or steam jet nozzle, but it is of course not with the intention of being limited to the use of steam as air may be used with equally good and possibly better results.

I claim:

1. In combination with the fire box of a furnace, of means for securing combustion therein comprising a pair of nozzles arranged near the forward corners of the fire box having portions adapted to be embedded in the bed of fuel and offset discharge portions arranged to inject air above the bed of fuel in the direction of the draft through the furnace, said discharge portions being elongated and flat whereby to emit the air in sheet formation, and being formed whereby the outer edges of the sheet will be parallel to the side walls of the fire box, substantially as and for the purpose described.

2. In combination with the fire box of a furnace, of means for securing combustion therein comprising a pair of nozzles arranged near the forward corners of the fire box having portions adapted to be embedded in the bed of fuel and offset discharge portions arranged to inject air above the bed of fuel in the direction of the draft through the furnace, said discharge portions being elongated and flat whereby to emit the air in sheet formation, the inner edges of said discharge portions converging inwardly toward each other so that the sheets discharged therefrom will merge into each other and the outer edges thereof being arranged whereby the outer edges of the sheet will be parallel to the side walls of the fire box, substantially as and for the purpose described.

3. In combination with a fire box, means for introducing air thereinto above the fuel comprising a pair of nozzles arranged within the forward corners of the fire box whereby to be partially embedded in the bed of fuel, said nozzles having flat discharge mouths adapted to emit air in sheet formation above the bed of fuel and in the direction of the draft, and means for supplying air to the nozzles, the outer edges of the mouths of the nozzles being arranged parallel to the side walls of the furnace, substantially as and for the purpose described.

4. In combination with a fire box, means for introducing air thereinto above the fuel comprising a pair of nozzles arranged within the forward corners of the fire box whereby to be partially embedded in the bed of fuel, said nozzles having flat discharge mouths adapted to emit air in sheet formation above the bed of fuel and in the direction of the draft, and means for supplying air to the nozzles, the outer edges of the mouths of the nozzles being arranged parallel to the side walls of the furnace while the inner edges thereof converge toward the rear of the fire-box, substantially as and for the purpose described.

5. In combination with the fire-box of a furnace, means for introducing air thereinto above the fuel comprising a supply pipe arranged to project into the fire box, a nozzle mouth thereon, and means for axially adjusting the nozzle mouth in different positions consisting of an adjustable recessed ring and projections on the nozzle mouth adapted to fit the recessed portion of the ring.

6. In combination with the fire box of a furnace, of means for injecting air into the fire chamber above the bed of fuel and toward the rear of the fire chamber in the general direction of the draft comprising a pair of heater pipes vertically disposed and arranged at the forward corners of the fire box within the fire chamber to be partially embedded in the bed of fuel, conducting pipes leading from a point below the fire box to the bottoms of the heater pipes, funnels constituting air intakes arranged outside of the furnace and opening to the pipe connections, and nozzles having offset mouths supported upon the upper ends of the heater pipes arranged to emit air in sheet formation, said mouths converging toward each other at their inner edges whereby the sheets of air will merge into a single sheet, substantially as and for the purpose described.

7. In combination with the fire box of a furnace, of means for injecting air into the fire chamber above the bed of fuel and toward the rear of the fire chamber in the general direction of the draft comprising a pair of heater pipes vertically disposed and arranged at the forward corners of the fire box within the fire chamber to be partially embedded in the bed of fuel, conducting pipes leading from a point below the fire box to the bottoms of the heater pipes, funnels constituting air intakes arranged outside of the furnace and opening to the pipe connections, and nozzles having offset mouths supported upon the upper ends of the heater pipes arranged to emit air in sheet formation, said mouths converging toward each other at their inner edges whereby the sheets of air will merge into a single sheet, and means for adjusting the position of the air intake funnel.

8. In combination with a fire box, means for introducing air thereinto above the fuel comprising a vertically disposed heater pipe, and a nozzle associated with said pipe adapted to discharge air over the fuel, the adjoining portions of the pipe and nozzle carrying adjustable interlocking lug and notched portions for retaining them against relative lateral turning movement in different adjusted positions.

In testimony whereof I affix my signature in presence of two witnesses.

JOHN H. PARSONS.

Witnesses:
LAWRENCE J. BROMAN,
JOHN F. LYNN.